(12) United States Patent
Lu et al.

(10) Patent No.: US 9,829,647 B2
(45) Date of Patent: Nov. 28, 2017

(54) EXPANDED BEAM FIBER OPTIC CONNECTOR, AND CABLE ASSEMBLY, AND METHODS FOR MANUFACTURING

(71) Applicants: CommScope Technologies LLC, Hickory, NC (US); CommScope Asia Holdings B.V., Bussum (NL)

(72) Inventors: Yu Lu, Eden Prairie, MN (US); Jeroen Antonius Maria Duis, MN Didam (NL); Sander Johannes Floris, Best (NL); Simon Petrus Andreas Bartholomeus Nouws, AN Schijf (NL)

(73) Assignees: CommScope Technologies LLC, Hickory, NC (US); CommScope Asia Holdings B.V., Bussum (NL)

( * ) Notice: Subject to any disclaimer, the term of this patent is extended or adjusted under 35 U.S.C. 154(b) by 0 days.

(21) Appl. No.: 14/907,214

(22) PCT Filed: Jul. 22, 2014

(86) PCT No.: PCT/US2014/047592
§ 371 (c)(1),
(2) Date: Jan. 22, 2016

(87) PCT Pub. No.: WO2015/013262
PCT Pub. Date: Jan. 29, 2015

(65) Prior Publication Data
US 2016/0161678 A1 Jun. 9, 2016

Related U.S. Application Data

(60) Provisional application No. 61/857,020, filed on Jul. 22, 2013, provisional application No. 61/857,015, filed on Jul. 22, 2013.

(51) Int. Cl.
*G02B 6/38* (2006.01)
*G02B 6/255* (2006.01)
(Continued)

(52) U.S. Cl.
CPC .......... *G02B 6/3846* (2013.01); *G02B 6/028* (2013.01); *G02B 6/2551* (2013.01); *G02B 6/264* (2013.01);
(Continued)

(58) Field of Classification Search
CPC .... G02B 6/3846; G02B 6/028; G02B 6/2551; G02B 6/264; G02B 6/3845; G02B 6/3853;
(Continued)

(56) References Cited

U.S. PATENT DOCUMENTS 4,165,496 A    8/1979   Di Domenico, Jr. et al.
4,423,922 A    1/1984   Porter
(Continued)

FOREIGN PATENT DOCUMENTS

CN       1049140      4/2003
EP       3 646 812 A1    4/1995
(Continued)

OTHER PUBLICATIONS

Michael E. McGrath and Richard W. Hoole, "Manufacturing's New Economies of Scale," May-Jun. 1992, Harvard Business Review, p. 9.*
(Continued)

*Primary Examiner* — John M Bedtelyon
(74) *Attorney, Agent, or Firm* — Merchant & Gould P.C.

(57) ABSTRACT

A fiber optic cable and connector assembly is disclosed. In one aspect, the assembly includes a cable optical fiber, an optical fiber stub and a beam expanding fiber segment optically coupled between the cable optical fiber and the optical fiber stub. The optical fiber stub has a constant mode field diameter along its length and has a larger mode field diameter than the cable optical fiber. In another aspect, a fiber optic cable and connector assembly includes a fiber
(Continued)

optic connector mounted at the end of a fiber optic cable. The fiber optic connector includes a ferrule assembly including an expanded beam fiber segment supported within the ferrule. The expanded beam fiber segment can be constructed such that the expanded beam fiber segment is polished first and then cleaved to an exact pitch length. The expanded beam fiber segment can be fusion spliced to a single mode optical fiber at a splice location behind the ferrule.

19 Claims, 10 Drawing Sheets

(51) Int. Cl.
  *G02B 6/26*        (2006.01)
  *G02B 6/028*       (2006.01)
(52) U.S. Cl.
  CPC ......... *G02B 6/3845* (2013.01); *G02B 6/3853* (2013.01); *G02B 6/3865* (2013.01); *G02B 6/3887* (2013.01)
(58) Field of Classification Search
  CPC ... G02B 6/3865; G02B 6/3887; G02B 6/3833
  See application file for complete search history.

(56) References Cited

U.S. PATENT DOCUMENTS

| | | | |
|---|---|---|---|
| 4,767,171 A | 8/1988 | Keil et al. | |
| 4,801,185 A | 1/1989 | Bricheno | |
| 5,317,663 A | 5/1994 | Beard et al. | |
| 5,367,594 A | 11/1994 | Essert et al. | |
| 5,497,438 A | 3/1996 | Ishikawa et al. | |
| 5,680,237 A | 10/1997 | Cheng | |
| 6,014,483 A | 1/2000 | Thual et al. | |
| 6,485,191 B1 | 11/2002 | Sato | |
| 6,612,751 B1 | 9/2003 | Watanabe et al. | |
| 6,839,483 B2 | 1/2005 | Reed et al. | |
| 6,840,684 B2 | 1/2005 | Melchior et al. | |
| 7,031,567 B2 | 4/2006 | Grinderslev et al. | |
| 7,090,407 B2 | 8/2006 | Melton et al. | |
| 7,155,096 B2* | 12/2006 | Chanclou ............... | G02B 6/262 385/123 |
| 7,333,702 B2* | 2/2008 | Fujita ..................... | G02B 6/264 385/124 |
| 7,711,220 B2 | 5/2010 | Scofet et al. | |
| 7,744,286 B2 | 6/2010 | Lu et al. | |
| 7,835,603 B2* | 11/2010 | De Barros ......... | G02B 6/02023 385/28 |
| 7,920,763 B1* | 4/2011 | Shou ........................ | G02B 6/32 385/31 |
| 8,419,622 B2* | 4/2013 | Shimotsu ................. | A61B 1/07 385/34 |
| 8,837,885 B2* | 9/2014 | Seo ........................ | G02B 6/2821 359/341.1 |
| 8,942,531 B2 | 1/2015 | Donlagic et al. | |
| 2002/0146211 A1 | 10/2002 | Stevens et al. | |
| 2003/0059180 A1 | 3/2003 | Tamura et al. | |
| 2003/0142918 A1 | 7/2003 | Melchior et al. | |
| 2005/0111782 A1 | 5/2005 | Donval et al. | |
| 2005/0265653 A1 | 12/2005 | Cai et al. | |
| 2007/0031095 A1 | 2/2007 | Fujita et al. | |
| 2007/0077014 A1 | 4/2007 | Gaeta et al. | |
| 2008/0219624 A1 | 9/2008 | Pimpinella et al. | |
| 2009/0202201 A1* | 8/2009 | Scofet .................. | G02B 6/4206 385/27 |
| 2010/0124394 A1 | 5/2010 | Meek et al. | |
| 2010/0329612 A1 | 12/2010 | Everett et al. | |
| 2010/0331626 A1 | 12/2010 | Shimotsu | |
| 2011/0008003 A1 | 1/2011 | Tamekuni et al. | |
| 2012/0155807 A1 | 6/2012 | Knapp | |
| 2012/0189252 A1 | 7/2012 | Bhagavatula et al. | |
| 2012/0321256 A1 | 12/2012 | Caveney et al. | |
| 2013/0004129 A1* | 1/2013 | Zhang ................... | G02B 6/262 385/80 |
| 2013/0039622 A1 | 2/2013 | Grinderslev | |
| 2013/0142918 A1 | 6/2013 | *Ye et al. | |
| 2013/0156382 A1 | 6/2013 | Park | |
| 2013/0163930 A1 | 6/2013 | Jian | |
| 2013/0183030 A1 | 7/2013 | Duis et al. | |
| 2014/0064665 A1 | 3/2014 | Ott et al. | |
| 2015/0063754 A1 | 3/2015 | Li et al. | |
| 2016/0077288 A1 | 3/2016 | Watte et al. | |
| 2016/0178851 A1 | 6/2016 | Lu et al. | |

FOREIGN PATENT DOCUMENTS

| | | |
|---|---|---|
| EP | 2 413 171 A1 | 2/2012 |
| JP | H04-355415 A | 12/1992 |
| JP | H5-11139 | 1/1993 |
| JP | 2004-286843 A | 10/2004 |
| JP | 2005-043442 | 2/2005 |
| JP | 2007-226119 | 9/2007 |
| JP | 2008-083622 A | 4/2008 |
| JP | 2009-175612 A | 8/2009 |
| JP | 2013-109351 | 6/2013 |
| WO | 2007/096584 A2 | 8/2007 |

OTHER PUBLICATIONS

International Search Report and Written Opinion for International Application No. PCT/US2014/047592 dated Nov. 18, 2014 (19 pages).
International Search Report and Written Opinion for International Application No. PCT/US2014/047601 dated Nov. 7, 2014 (12 pages).
Gravey et al. "Expanded Single Mode Fiber" © 2001 OSA/OFC (3 pages).
Chanclou et at "Design and Performance of Expanded Mode Fiber Using Microoptics." *J. of Lightwave Tech.* vol. 20, No. 5. May 2002, pp. 836-842.
Chanclou et al. "Collective Microoptics on Fiber Ribbon for Optical Interconnecting Devices." *J. of Lightwave Tech.* vol. 17, No. 5. May 1999, pp. 924-928.
Fiber Optics-Fiber Basics Handout. Newport—Photonics Technical Note #2 (6 pages). Known Prior Art.
European Search Report for EP Application No. 14828755.0 dated Feb. 6, 2017 (7 pages).
Horche et al. "Spectral Behavior of a Low-Cost All-Fiber Component Based on Untapered Multifiber Unions." IEEE Photonics Technology Letters. vol. 1, No. 7, Jul. 1989, pp. 184-187.
Li et al. "Demonstration of high extinction ratio modal interference in a two-mode fiber and its applications for all-fiber comb filter and high-temperature sensor." Optics Communcations. vol. 250 (2005) pp. 280-285.
Mohammed et al. "All-fiber multimode interference bandpass filter." Optics Letters, vol. 31, No. 17. (Sep. 1, 2006) pp. 2547-2549.
Mohammed et al. "Wavelength Tunable Fiber Lens Based on Multimode Interference." Journal of Lightwave Technology, vol. 22, No. 2. Feb. 2004. pp. 469-477.
European Search Report for EP Application No. 14 82 9774 dated Feb. 1, 2017 (8 pages).
Extended European Search Report for European Patent Application No. 14828755.0 dated Sep. 12, 2017, 13 pages.
Chen, D. et al., "A New Factory Splice-On Fiber Optic Connector with High Performance and Reliability by Machine Automation", Optical Society of America, 3 pages. (2016).

* cited by examiner

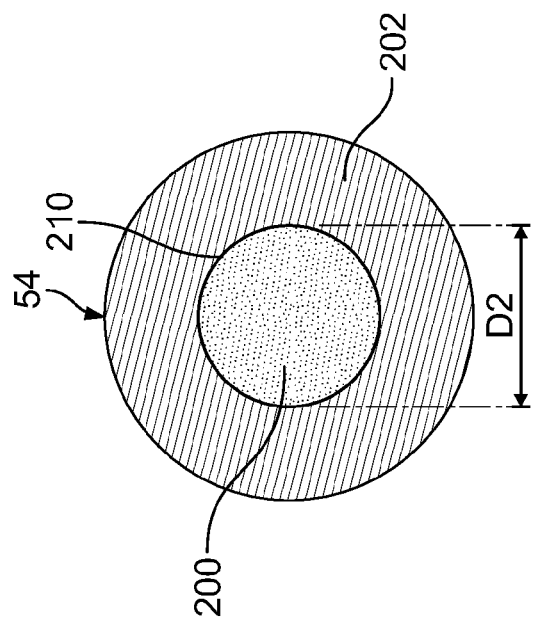
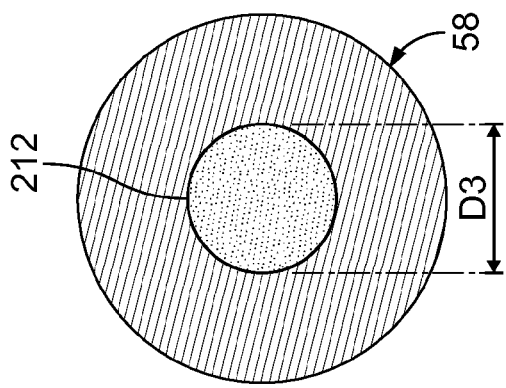
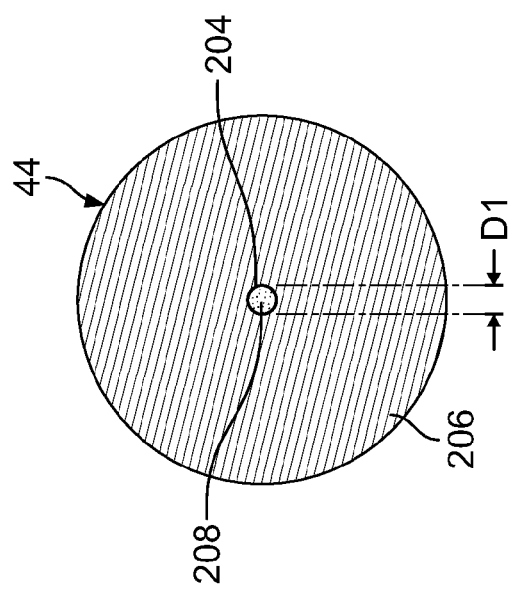

EXPANDED BEAM FIBER OPTIC CONNECTOR, AND CABLE ASSEMBLY, AND METHODS FOR MANUFACTURING

CROSS-REFERENCE TO RELATED APPLICATION(S)

This application is a National Stage of PCT International Patent application No. PCT/US2014/047592, filed 22 Jul. 2014, which claims benefit of U.S. Patent Application Ser. No. 61/857,020 filed on Jul. 22, 2013 and to U.S. Patent Application Ser. No. 61/857,015 filed on Jul. 22, 2013, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors, fiber optic connector and cable assemblies and methods for manufacturing.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule assembly includes a ferrule and a hub mounted to a rear end of the ferrule. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of their respective ferrules abut one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

Connectors are typically installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber.

Connectors can also be installed on fiber optic cables using an optical splice. The optical splice can be mechanical splice or a fusion splice. Mechanical splices are often used for field terminated connectors. Fusion splices can be used to fusion splice the optical fiber of the fiber optic cable to the rear end of an optical fiber stub secured within a ferrule. United States Patent Application Publication Pub. No. US 2014/0064665 A1 discloses example splice-on connector configurations.

What is needed are methods and structures for reducing signal loss at demateable interfaces of fiber optic connectors.

SUMMARY

Teachings of the present disclosure relate to methods and structures for increasing the fiber mode field diameter at the demateable interface between two fiber optic connectors so as to reduce signal loss at the interface.

One aspect of the present disclosure relates to a fiber optic cable and connector assembly. The assembly includes a ferrule having a front end and a rear end, a cable optical fiber, an optical fiber stub having a first and second portion and a beam expanding fiber segment optically coupled between the cable optical fiber and the optical fiber stub. The second portion of the optical fiber stub projects rearwardly from the rear end of the ferrule to be spliced. In one example, the optical fiber stub has a constant mode field diameter along its length and has a larger mode field diameter than the cable optical fiber.

Another aspect of the present disclosure relates to a fiber optic cable and fiber assembly. The assembly includes a ferrule having a front end and a rear end, an expanded beam fiber segment having a front portion secured within the ferrule and a rear portion that projects rearwardly from the rear end of the ferrule, and a fiber optic cable having a single mode optical fiber optically coupled to the expanded beam fiber segment at a splice location behind the rear end of the ferrule.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 5 is a cross-sectional view taken along section line 5-5 of FIG. 3;

FIG. 6 is a cross-sectional view taken along section line 6-6 of FIG. 3;

FIG. 7 is a cross-sectional view taken along section line 7-7 of FIG. 3;

DETAILED DESCRIPTION

Figure 1:
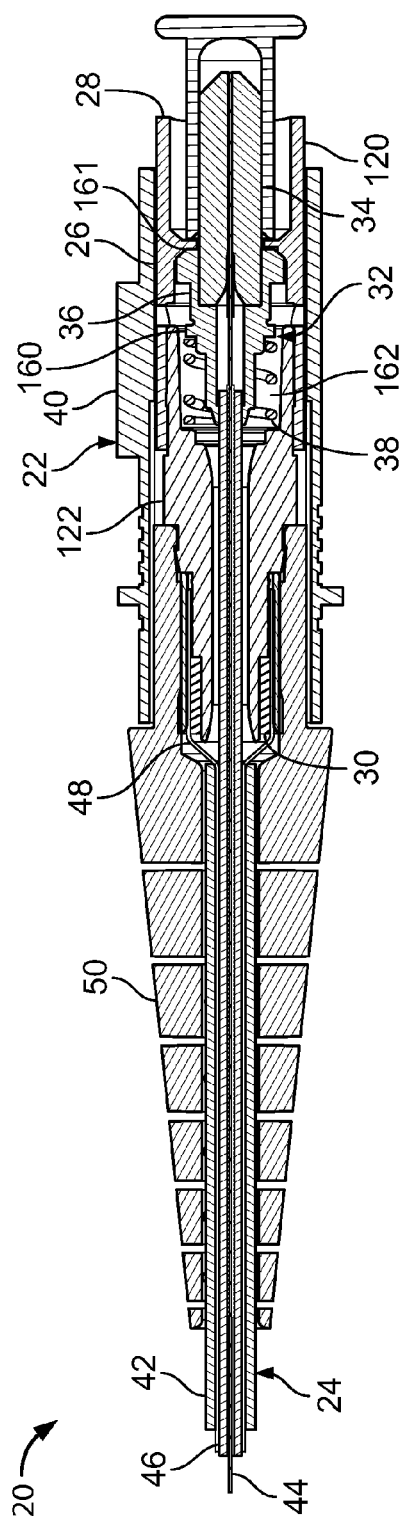
FIG. 1 is a longitudinal cross-sectional view of a fiber optic cable and connector assembly in accordance with the principles of the present disclosure.

FIG. 1 illustrates a fiber optic cable and connector assembly 20 in accordance with the principles of the present disclosure. The fiber optic cable and connector assembly 20 includes a fiber optic connector 22 secured to the end of a fiber optic cable 24. The fiber optic connector 22 includes a connector body 26 having a front end 28 and a rear end 30. The fiber optic connector 22 also includes a ferrule assembly 32 mounted within the connector body 26. Ferrule assembly 32 includes a ferrule 34 having a rear end supported within a ferrule hub 36. A spring 38 biases the ferrule assembly 32 in a forward direction relative to the connector body 26. The fiber optic connector 22 also includes a release sleeve 40 that is mounted over the connector body 26 that can be pulled-back relative to the connector body to release the front end 28 of the connector body 26 from a corresponding fiber optic adapter. The fiber optic cable 24 is shown including an outer jacket 42 that encloses a cable optical fiber 44 positioned within a protective buffer 46 (e.g., a buffer layer such as a loose buffer layer, a tight buffer layer or a loose/tight buffer layer). The fiber optic cable 24 also includes a strength layer 48 (e.g., aramid yarn or another type of tensile reinforcing material) positioned between the buffer tube 46 and the outer jacket 42. The strength layer 48 is shown anchored (e.g., crimped) to the rear end 30 of the connector body 26. The fiber optic connector 22 includes a tapered boot 50 that provides strain relief and/or fiber bend radius protection at the interface between the fiber optic connector 22 and the fiber optic cable 24.

Figure 2:
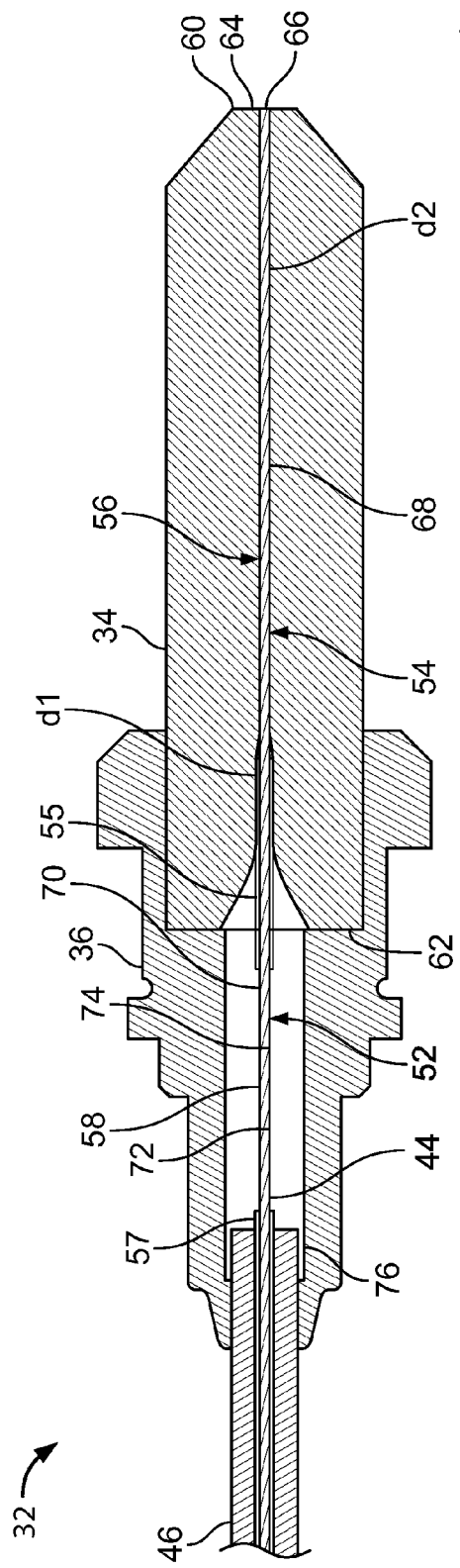
FIG. 2 is an enlarged view showing a ferrule hub and splice locations for the fiber optic cable and connector assembly of FIG. 1.

Referring to FIG. 2, the fiber optic connector 22 includes a fiber structure 52 that is optically coupled (e.g., spliced) to the cable optical fiber 44. The fiber structure 52 includes an optical fiber stub 54 secured (e.g., adhesively affixed) within a longitudinal bore 56 of the ferrule 34. The optical fiber structure 52 also includes a beam expanding fiber segment 58 positioned between the cable optical fiber 44 and the optical fiber stub 54. The beam expanding fiber segment 58 is configured for expanding light beams traveling in a direction from the cable optical fiber 44 toward the optical fiber stub 54 and for focusing light beams traveling in a direction from the optical fiber stub 54 toward the cable optical fiber 44. The optical fiber stub 54 can include a construction for maintaining a constant mode field diameter along a length of the optical fiber stub 54. It will be appreciated that the phrase "constant mode field diameter along a length of the optical fiber stub" means that the mode field diameter is generally constant along the length of the optical fiber stub and includes embodiments where minor variations in diameter that do not have a meaningful impact on optical signals passing therethrough are present.

As used herein, "mode field" means the portion of an optical fiber through which light passes during a transmission through the optical fiber of a light signal having a predetermined wavelength. It will be appreciated that the "mode field" of a given optical fiber may vary depending upon the wavelength of the light signal being transmitted therethrough. As used herein, the "mode field area" is the transverse cross-sectional area of the mode field at a given location of the optical fiber. The "mode field area" is typically circular and defines a mode field diameter across the mode field area. The mode field diameter can be defined as where the power density is reduced to $1/e^2$ of the maximum power density. The mode field area can also be referred to as a "spot area" or "beam area" and the mode field diameter can also be referred to as the spot size or beam width.

It will be appreciated by those of skill in the art that the fiber optic connector 22 depicted at FIG. 1 is an SC style connector. It will be appreciated that the various aspects of the present disclosure are also applicable to other types of connectors having different form factors. Example other types of connectors include LC connectors, ST connectors, or ruggedized/hardened connectors of the type disclosure at U.S. Pat. Nos. 7,744,286 and 7,090,407 which are hereby incorporated by reference.

Referring again to FIG. 1, the ferrule 34 can be positioned at least partially within the connector body 26 adjacent the front end 28 of the connector body 26. As shown at FIG. 2, the ferrule 34 includes a front end 60 positioned opposite from a rear end 62. The front end 60 includes an end face 64 at which an interface end 66 of the optical fiber stub 54 is located. The longitudinal bore 56 of the ferrule 34 extends through the ferrule 34 from the front end 60 to the rear end 62. The optical fiber stub 54 includes a first portion 68 and a second portion 70. The first portion 68 can be secured within the longitudinal bore 56 of the ferrule 34 and the second portion 70 can extend rearwardly from the ferrule 34. The first portion 68 of the optical fiber stub 54 is preferably secured by an adhesive (e.g., epoxy) within the longitudinal bore 56 of the ferrule 34. The interface end 66 of the optical fiber stub 54 can include a polished end face accessible at the front end 60 of the ferrule 34. The optical fiber stub 54 can extend all of the way through the ferrule 34 without any splices within the ferrule 34.

In one example, the optical fiber stub 54 has a construction designed and configured to maintain a constant mode field diameter along its length. In one example, the optical fiber stub 54 is a step-index optical fiber having a core 200 (see FIG. 3) surrounded by a cladding 202 (see FIG. 3) with a discrete radial step in refractive index between the core and the cladding. In certain examples, the optical fiber stub 54 is designed to inhibit the excitation of multiple transmission modes over a predetermined range of wavelengths (e.g., 1260-1650 nanometers). Thus, the stub 54 supports only a single fundamental mode over the predetermined range of wavelengths. In certain examples, the optical fiber stub 54 has a core diameter greater than 10 micrometers, or greater than 12 micrometers, or greater than 20 micrometers, or greater than 30 micrometers, or greater than 40 micrometers, or greater than 50 micrometers. In other examples, the optical fiber stub 54 has a core diameter within the range of 50 to 100 micrometers. In other examples, the optical stub fiber 54 has a core diameter in the range of 10 to 125 micrometers. In still other examples, the optical fiber stub 54 can have a cladding having an outer diameter in the range of 120 to 130 micrometers.

Referring to FIG. 2, the longitudinal bore 56 of the ferrule 34 can have a stepped diameter. For example, the longitudinal bore 56 can have a first diameter d1 that is larger than a second diameter d2. The first diameter d1 can be positioned at the front end of the ferrule 34 and the second diameter d2 can be positioned adjacent the rear end of the ferrule 34. In certain examples, the portion of the optical fiber stub 54 within the section of the longitudinal bore 56 having the first diameter d1 can be protected by a protective coating acrylate or other polymeric material) and the portion of the optical fiber stub 54 within the section of the longitudinal bore 56 having the second diameter d2 includes bare glass (i.e., a glass core and cladding that is not surrounded by a protective coating).

Figure 3:
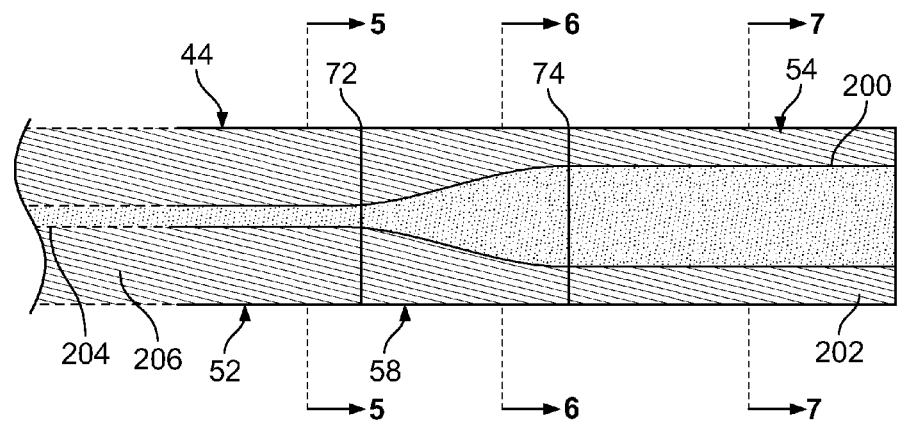
FIG. 3 is a schematic, longitudinal cross-sectional view showing the mode field for an optical fiber structure of the fiber optic cable and connector assembly of FIG. 1.

In certain examples, the cable optical fiber 44 is a step-index optical fiber having a core 204 (see FIG. 3) surrounded by a cladding 206 (see FIG. 3). In a step index optical fiber, a discrete step in refractive index is provided radially between the core and the cladding. In one example, the cable optical fiber 44 functions as a single mode optical fiber and supports a single fundamental transmission mode for light transmissions having wavelengths in the predetermined wavelength range (e.g., 1260-1650 nanometers) specified with respect to the optical fiber stub 54. In certain examples, the cable optical fiber 44 has a core diameter in the range of 5 to 15 micrometers, or in the range of 8 to 12 micrometers, or of about 10 micrometers. In certain examples, the cable optical fiber 44 can be configured to accommodate multi-mode optical transmissions. Portions of the cable optical fiber 44 can be protected by a coating 57 (e.g., acrylate or other polymeric material) that surrounds the cladding layer.

It is preferred for the core diameter of the optical fiber stub 54 to be larger than the core diameter of the cable optical fiber 44 (e.g., at least 50% larger). In certain examples, the core diameter of the optical fiber stub 54 is at least two times, three times, four times, five times, six times, seven times, eight times, nine times or ten times as large as the core diameter of the cable optical fiber 44. It is preferred for the mode field diameter of the optical fiber stub 54 to be larger than the mode field diameter of the cable optical fiber 44 (e.g., at least 50% larger). In certain examples, the mode field diameter of the optical fiber stub 54 is at least two times, three times, four times, five times, six times, seven times, eight times, nine times or ten times as large as the mode field diameter of the cable optical fiber 44.

As described above, in certain examples, the beam expanding fiber segment 58 of the optical fiber structure 52 can be configured to expand a light beam traveling in a first direction through the beam expanding fiber segment 58 and to focus a light beam traveling in an opposite second direction through the beam expanding fiber segment 58. In certain examples, the beam expanding fiber segment 58 can include a collimator for expanding/focusing light including, for example, a lens or an expanded core of a fiber, in particular, a thermally-expanded core. In certain examples, the beam expanding fiber segment 58 can include a lens such as a graded index (GRIN) lens. In a preferred example, the beam expanding fiber segment 58 can include a quarter pitch GRIN lens. In certain examples, the beam expanding fiber segment 58 can include a graded-index optical fiber having a core having a generally parabolic fiber refractive index profile that has a maximum value at the center of the core and that gradually decreases as the core extends radially away from the center of the core. It will be appreciated that the beam expanding fiber segment 58 functions to provide a gradual transition in mode field diameter between the cable optical fiber 44 and the optical fiber stub 54 (see FIG. 3 where the mode fields are the darkened portions of the fiber segments).

Referring to FIG. 3, an example mode field configuration for the optical fiber structure 52 is depicted. As shown at FIG. 3, the beam expanding fiber segment 58 is a GRIN lens that is spliced between the cable optical fiber 44 and the optical fiber stub 54 so as to provide an optical coupling between the cable optical fiber 44 and the optical fiber stub 54. For example, the beam expanding fiber segment 58 is spliced to the cable optical fiber 44 at splice location 72 and the beam expanding fiber segment 58 is spliced to the optical fiber stub 54 at splice location 74. In a preferred example, the splice locations 72, 74 are positioned inside the ferrule hub 36 such that the ferrule hub 36 protects and encloses the splice locations 72, 74. It will be appreciated that at the time of splicing, the beam expanding fiber segment 58 can include a bare glass section of graded index fiber, and the ends of the cable optical fiber 44 and the optical fiber stub 54 can also be bare glass (i.e., uncoated glass). After splicing, a protective buffer layer 76 can be provided over the splice locations 72, 74 and over the beam expanding fiber segment 58. Thereafter, the ferrule hub 36 can be positioned (e.g., over molded) over the rear end of the ferrule 34 and over the optical fiber structure 52. In this way, the second portion 70 of the optical fiber stub 54, the beam expanding fiber segment 58, an end portion of the cable optical fiber 44 and the rear end of the ferrule 34 can all be contained within the ferrule hub 36. The spring 38 can abut against the ferrule hub 36 to bias the ferrule assembly 32 in the forward direction.

Referring still to FIG. 3, the beam expanding fiber segment 58 provides a gradual transition in mode field diameter from the smaller core of the cable optical fiber 44 to the larger core of the optical fiber stub 54. FIG. 5 shows a mode field area 208 of the cable optical fiber 44 having a mode field diameter D1. FIG. 7 shows a larger mode field area 210 of the optical fiber stub 54 having a mode field diameter D2. FIG. 6 shows a mode field area 212 provided by the beam expanding fiber segment 58 at a location about half way along the length of the beam expanding fiber segment 58. The mode field area 212 has a mode field diameter D3.

In the depicted example, splice location 74 is spaced rearwardly from the rear end of the ferrule 34. In certain examples, the splice location 74 is positioned no more than 20 millimeters from the rear end of the ferrule 34. In still other examples, the splice location 74 is positioned 5 millimeters or less from the rear end of the ferrule 34. In some examples, the first and second splice locations 72, 74 are fusion splices. The splice locations 72, 74 can include factory fusion splice. A "factory fusion splice" is a splice performed at a manufacturing facility as part of a manufacturing process. In certain examples, an active alignment system is used to align the fiber sections prior to splicing. In still other examples, the splices can be a field splices.

Figure 4:
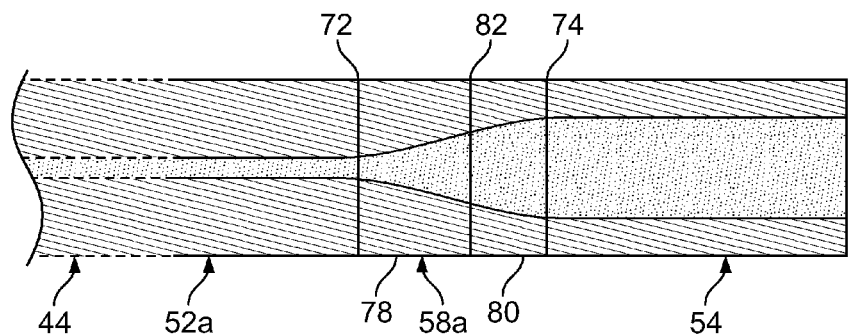
FIG. 4 is a schematic longitudinal cross-sectional view showing the mode field for an alternative optical fiber structure that can be used in the fiber optic cable and connector assembly of FIG. 1.

FIG. 4 shows an alternative optical fiber structure 52*a* that can be used in the fiber optic connector 22. The optical fiber structure 52*a* includes a two-piece beam expanding fiber segment 58*a*. The two-piece beam expanding fiber segment 58*a* includes a pre-expansion fiber 78 and a primary beam expanding fiber 80 joined at a splice 82. Similar to the previously subscribed example, the two-piece beam expanding fiber segment 58*a* is optically coupled between the cable optical fiber 44 and the optical fiber stub 54. The pre-expansion fiber 78 and the primary beam expanding fiber 80 cooperate to expand light beams traveling from the cable optical fiber 44 to the optical fiber stub 54 and to focus light beams traveling from the optical fiber stub 54 to the cable optical fiber 44.

Referring back to FIG. 1, the connector body includes a front piece 120 and a rear piece 122. The front piece 120 forms the front interface end 28 of the fiber optic connector 22 and the rear piece 122 is configured to allow the strength layer 48 (e.g., aramid yarn, fiberglass or other strength members capable of providing tensile reinforcement to the fiber optic cable 24) of the fiber optic cable 24 to be anchored. In some examples, the strength layer 48 can be secured to the rear piece 122 of the connector body 26 with a mechanical retainer such as a crimped sleeve. In other examples, adhesive or other means can be used to secure the strength layer 48 to the connector body 26.

The front and rear pieces 120, 122 of the connector body 26 can interconnect the other by connection such as a snap fit connection, an adhesive connection or other type of connection. When the front and rear pieces 120, 122 are connected together, the spring 38 and the ferrule hub 38 are captured between the front and rear pieces 120, 122. The hub 36 can be shaped to include a flange 160 that engages the spring 38. Additionally, the hub 36 can be configured to support the rear end of the ferrule 34 within the connector body 26. Furthermore, a forward end of the flange 160 can be configured to engage a shoulder 161 within the connector body 26 to halt forward movement of the ferrule assembly 32 caused by the forward bias of the spring 38. The spring 38 can be captured within a spring pocket 162 defined by the rear piece 122 and, as described above, can function to bias the ferrule assembly 32 in a forward direction relative to the connector body 26. The hub 36 is a structure secured on the ferrule 34 such that the ferrule 34 and the hub 36 move together as a unit relative to the connector body 26. As described above, the hub 36 can include structure that interferes with an internal structure (e.g., a stop) of the connector body 26 to limit the forward movement of the ferrule assembly 32 and to prevent the ferrule assembly 32 from being pushed out the front end of the connector body 26 by the spring 38.

As described above, the fiber optic connector 22 is shown having an SC-type intermatability profile. As such, the fiber optic connector 22 can be adapted to be received within an SC-type fiber optic adapter that is used to couple two of the connectors together to provide an optical connection thereinbetween. When the fiber optic connector 22 is inserted within a fiber optic adapter, exterior shoulders of the connector body 26 are engaged by latches of the fiber optic adapter to retain the fiber optic connector 26 within the fiber optic adapter. To release the fiber optic connector 22 from the adapter, the release sleeve 40 is slid rearwardly relative to the connector body 26 thereby causing the latches of the fiber optic adaptor to disengage from the exterior shoulders of the connector body 26 such that the fiber optic connector 22 can be withdrawn from the fiber optic adapter. An example fiber optic adaptor is disclosed at U.S. Pat. No. 5,317,663 which is hereby incorporated by reference in its entirety.

As described above, the beam expanding fiber segment 58 can include a graded index lens (GRIN). A GRIN lens is made with a refractive index that varies parabolically as a function of the radius. The amount of expansion provided by the GRIN lens is dependent upon its construction and length. Typically, maximum expansion is achieved at multiples of the quarter pitch of the GRIN lens. As indicated above, the amount of expansion provided by the GRIN lens is dependent upon its configuration and length. By using the optical fiber stub 54 in combination with the beam expanding fiber segment 58, the beam expanding fiber segment 58 can be precisely controlled to achieve a desired level of expansion. The interface end 66 of the optical fiber stub 54 can be polished in a conventional fashion to produce conventional end face geometry such as, but not limited to, straight, flat, curved or slanted configurations without modifying the length and degree of expansion provided by the beam expanding fiber segment 58. The larger mode field diameter provided through the cooperation of the beam expanding fiber segment 58 and the optical fiber stub 54 reduces the importance of precise co-axial alignment at the connector to connector interface. The ferrule 34 can be constructed of a relatively hard material capable of protecting and supporting the first portion 68 of the optical fiber stub 54. In one example, the ferrule 34 has a ceramic construction. In other examples, the ferrule 34 can be made of alternative material such as Ultem, thermoplastic material such as polyphenylene, sulfide (PPS), or other engineering plastics or metals. In certain examples, the ferrule 34 can have a longitudinal length in the range of 5-15 millimeters.

In some examples, the hub 36 can have a polymeric construction that has been overmolded over the rear end of the ferrule 34 and over the splice locations (e.g., splice locations 72 and 74 or splice locations 72, 74 and 80). Additionally, in certain examples, the overmolded hub 36 can be formed of a hot melt adhesive or other material that can be applied and cured at relatively low molding temperatures and pressures. The ferrule hub 36 can also be formed from a UV curable material (i.e., materials that cure when exposed to ultraviolet radiation/light), for example, UV curable acrylates, such as OPTOCAST™ 3761 manufactured by Electronic Materials, Inc. of Breckenridge, Colo.; ULTRA LIGHT-WELD® 3099 manufactured by Dymax Corporation of Torrington, Conn.; and 3M™ Scotch-Weld™ manufactured by 3M of St. Paul, Minn. The use of UV curable materials is advantageous in that curing can occur at room temperature and at generally lower pressures (e.g., less than 30 kpsi, and generally between 20-30 kpsi). The availability of low pressure curing helps to insure that the components, such as the optical fibers, being overmolded are not damaged during the molding process. By protecting the splices within the hub at a location in close proximity to the ferrule 36, it is possible to manufacture a fiber optic connector that is relatively short in length. Providing one or more of the splice locations within 5 millimeters of the rear end of the ferrule 34 assists in designing the fiber optic connection in compliance with standard industry for customer side load and connector length specifications (e.g., GR-326 size load and length requirements).

Figure 8:
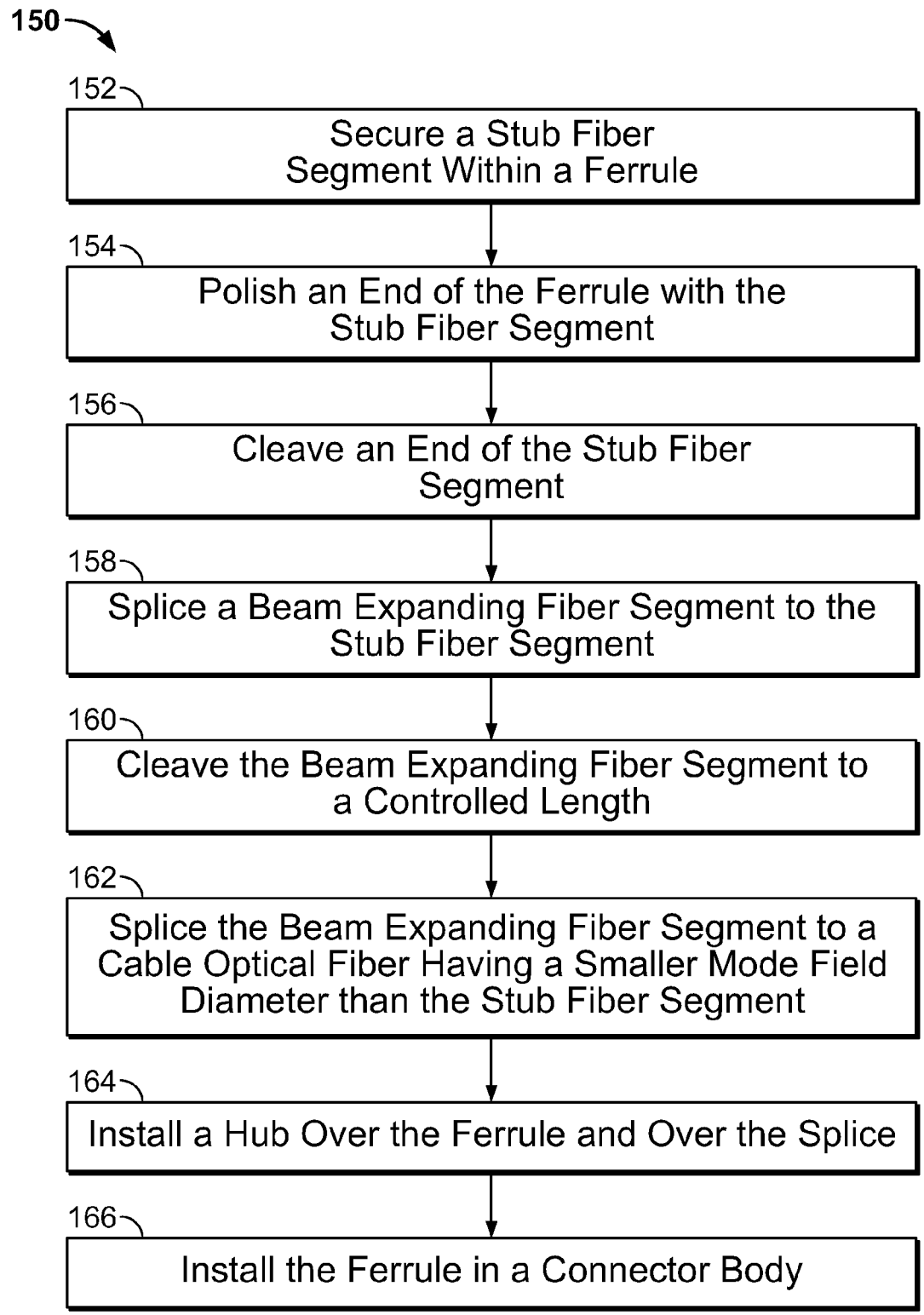
FIG. 8 is a flow chart illustrating an example method in accordance with the principles of the present disclosure for manufacturing the fiber optic cable and connector assembly of FIG. 1.

FIG. 8 is a flow chart illustrating an example method 150 for manufacturing the fiber optic cable and connector assembly 20. In this example, the method 150 includes operations 152, 154, 156, 158, 160, 162, 164 and 166.

The operation 152 is performed to secure the optical fiber stub 54 in the ferrule 74. As previously described, the optical fiber stub 54 can be adhesively secured within the bore of the ferrule 34.

The operation 154 is performed to polish the end face 64 of the ferrule 34 and the corresponding interface end 66 of the optical fiber stub 54 secured within the ferrule 34. The end face of the interface end 66 of the optical fiber stub 54 can be polished having a desired geometry.

The operation 156 is performed to cleave the rear end of the optical fiber stub 54. In one example, after cleaving, the rear end of the optical fiber stub 54 can be within 5 millimeters of the rear of the ferrule 34.

The operation 158 is performed to splice the beam expanding fiber segment 58 the rear end of the optical fiber stub 54. In another example, beam expanding fiber segment 58a can be spliced to the optical stub fiber instead of the beam expanding fiber segment 58.

The operation 160 is performed to cleave the beam expanding fiber segment 58 to a controlled length. The length of the beam expanding fiber segment 58 can be controlled to achieve a desired amount of expansion. Both ends of the beam expanding fiber segment 58 can be cleaved prior to splicing to the optical fiber stub 54, or one end of the beam expanding fiber segment 58 can be cleaved after splicing to the fiber optic stub 54. In the case of the expanding fiber segment 58a, the pre-expansion fiber 78 and the primary expansion fiber 80 can be cleaved to desired lengths, spliced together and then the primary expansion fiber 80 can be spliced to the optical fiber stub 54. Of course, the order of splicing can be varied such that the primary expansion fiber 80 is first spliced to the optical fiber stub 54 and then spliced to the pre-expansion fiber 78.

The operation 162 then is performed to splice the beam expanding fiber segment 58 to the cable optical fiber 44. In another embodiment, the beam expanding fiber segment 58a is spliced to the cable optical fiber 44 by splicing the pre-expansion fiber 78 to the cable optical fiber 44.

The operation 164 is performed to install the ferrule hub 36 over the rear end of the ferrule 34 and over the splice locations. The ferrule hub 36 can contain and protect the beam expanding fiber segment 58, 58a and the various splices used to couple the beam expanding fiber segment 58, 58a between the optical fiber stub 54 and the cable optical fiber 44.

The operation 166 is performed to install the ferrule assembly 32 in the connector body 26. In certain embodiments, the rear connector piece 122 and the spring have been slid over the cable optical fiber 44 prior to over molding the hub. In this step, the ferrule assembly 32 is loaded into the front piece 120, the spring is slid from the cable optical fiber 44 to a position behind the hub and within the front connector piece 120, and the rear connector piece is slid forwardly from the cable optical fiber 44 into engagement with the front connector piece 122 thereby capturing the hub and the spring between the front and rear connector pieces 120, 122.

Another aspect of the present disclosure relates to a method for mass producing and distributing fiber optic connector assemblies. One aspect of the method relates to the centralized manufacturing of large quantities of ferrules having optical fiber stubs mounted therein. The optical fiber stubs can be of the type described herein and can include relatively large mode field diameters. In certain examples, the volume of the ferrule and stub combinations manufactured at a given centralized location can exceed a volume of 500,000; 1,000,000; 2,000,000; or 3,000,000 per year. The ferrule and stub combinations can be manufactured in a first factory location using highly precise polishing technology and equipment. The first factory location can be used to manufacture the ferrule and stub assemblies according to method operations 152-154 such that the ferrule assemblies manufactured at the central location each include a ferrule 34 and an optical fiber stub 54 of the type described herein having a constant mode field diameter along its length.

The method also leads to distributing the ferrule and stub assemblies manufactured at the first factory location to regional factories/mass production locations closer to the intended point of sales. During shipping of the ferrule and stub assemblies, the rear portions 70 of the optical fiber stubs 54 can be coated with a protective coating layer (e.g., acrylate) to provide protection during transit, and or covered with a protective cap secured to the back end of the ferrule. Similarly, dust caps can be proved over the front ends of the ferrules 34. The ultimately small size of the ferrule and stub fiber assemblies allows large, large volumes of such ferrule and stub fiber assemblies to be effective shipped at relatively low cost. High costs associated with extensive shipment of cable can be significantly reduced. At the regional locations, the protective coatings can be stripped from the fiber stubs and operations 156-166 can be performed at the regional factory locations to splice the expansion fibers 58, 58a to the optical fiber stubs 54 and to splice the expansion fibers 58, 58a to the cable optical fibers 44.

In other embodiments, steps 152-160 can be performed at the central manufacturing location. Once the optical fiber stubs 54 have been processed with the ferrules 34 and the beam expansion fiber 58, 58a have been spliced to the optical fiber stubs, protective caps (e.g., dust caps, can be placed over the front and rear ends of the ferrules to protect the interface ends 66 of the optical fiber stubs 54 as well as the expansion fibers 58 or 58a and their corresponding splices. Thereafter, the protected ferrule assemblies can be shipped to regional locations for final assembly on a cable (e.g., steps 162-166).

Figure 9:
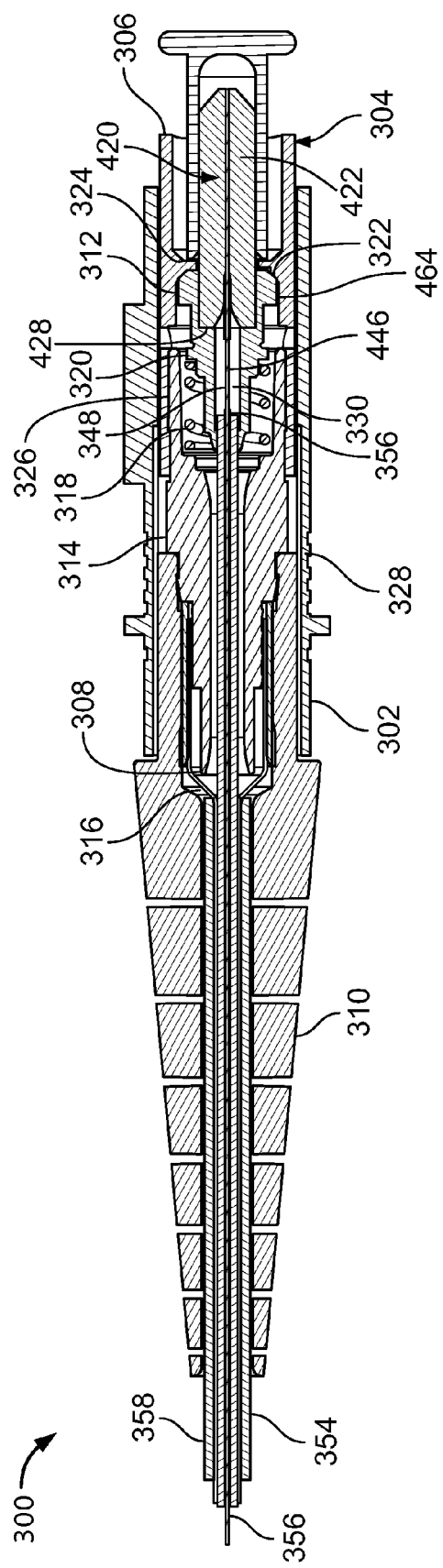
FIG. 9 is a longitudinal cross-sectional view of a fiber optic cable and connector assembly in accordance with the principles of the present disclosure.
Figure 10:
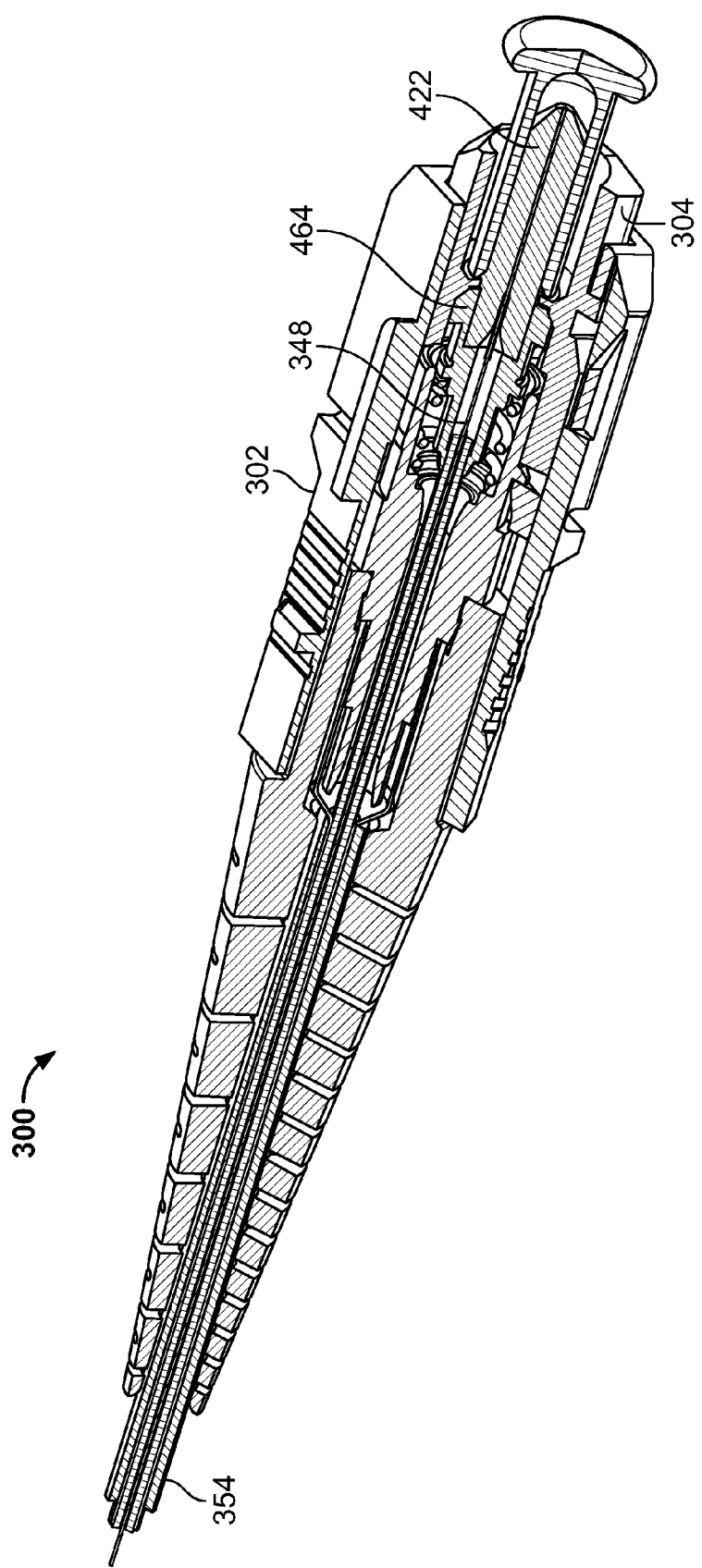
FIG. 10 is a front, perspective, cross-sectional view of the fiber optic cable and connector assembly of FIG. 9.

FIGS. 9-10 show another example of a fiber optic cable and connector assembly 300 in accordance with the principles of the present disclosure. The fiber optic cable and connector assembly 300 includes a fiber optic connector 302 secured to the end of a fiber optic cable 354. The fiber optic connector 302 includes a connector body 304 having a front end 306 and a rear end 308. The fiber optic connector 302 also includes a ferrule assembly 420 mounted within the connector body 304. Ferrule assembly 420 includes a ferrule 422 having a rear end 428 supported within a ferrule hub 464. A spring 318 biases the ferrule assembly 420 in a forward direction relative to the connector body 304. The fiber optic connector 302 also includes a release sleeve 328 that is mounted over the connector body 304 that can be pulled-back relative to the connector body to release the front end 306 of the connector body 304 from a corresponding fiber optic adapter. The fiber optic cable 354 is shown including an outer jacket 358 that encloses a cable optical fiber 356 positioned within a protective buffer 362 (e.g., a buffer layer such as a loose buffer layer, a tight buffer layer or a loose/tight buffer layer).

In this example, the cable optical fiber 356 functions as a single mode optical fiber for light transmissions having wavelengths in the range 1310 to 1550 nanometers. In certain examples, the cable optical fiber 356 is a step-index optical fiber. In a step index optical fiber, a discrete step in refractive index is provided radially between the core and the cladding. The fiber optic cable 354 also includes a strength layer 348 (e.g., aramid yarn or another type of tensile reinforcing material) positioned between a buffer tube 360 and the outer jacket 358. The strength layer 348 is shown anchored (e.g., crimped) to the rear end 308 of the connector body 304. The fiber optic connector 302 includes a tapered boot 310 that provides strain relief and/or fiber bend radius protection at the interface between the fiber optic connector 302 and the fiber optic cable 354.

Figure 11:
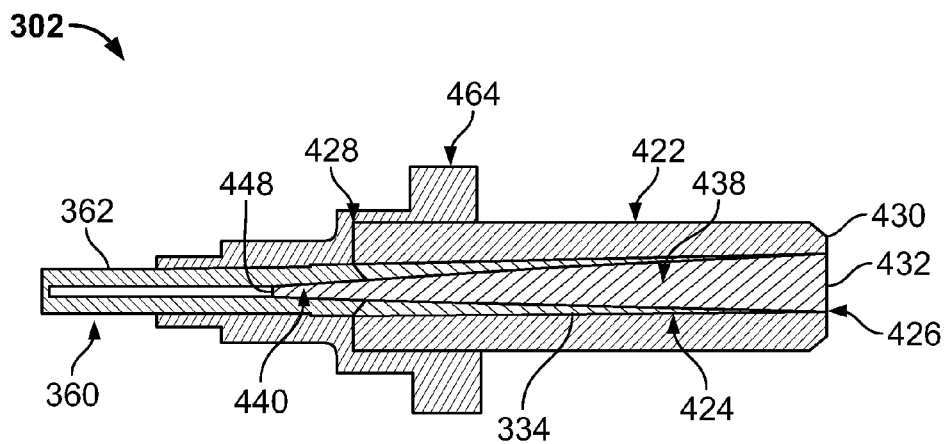
FIG. 11 is a perspective view of a ferrule assembly in accordance with the principles of the present disclosure.
Figure 12:
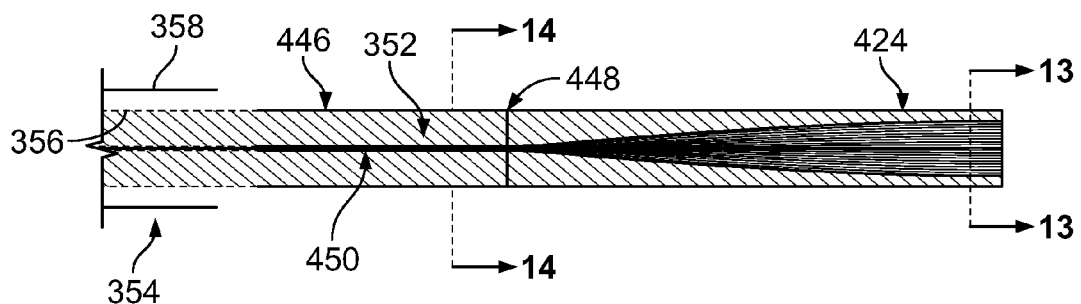
FIG. 12 is a perspective view of fibers shown in the ferrule assembly of FIG. 11.

Referring to FIGS. 11-12 an example mode field configuration for an expanded beam fiber segment 424 is depicted. The expanded beam fiber segment 424 is a GRIN lens that is spliced to optical fiber 446 at splice location 448 so as to provide an optical coupling between the optical fiber 446 and the expanded beam fiber segment 424. In one example, the splice location 448 can be behind the rear end 428 of the ferrule 422. In providing this construction, the mode field diameter of the optical fiber 446 can be increased to any desired diameter. This arrangement has the advantage of providing for less sensitivity to lateral and longitudinal fiber core misalignment and less sensitivity to the contamination and defects of the fiber.

In certain examples, the splice location 448 can be positioned no more than 20 mm from the rear end 428 of the ferrule 422. In other examples, the splice location 448 can be positioned 5 mm or less from the rear end 428 of the ferrule 422. In some examples, the splice location 448 is a fusion splice. The splice location 448 can be a factory fusion splice. A "factory fusion splice" has been previously defined above. Accordingly, the description and features of such are also applicable in this example.

The fiber optic connector 302 includes the expanded beam fiber segment 424 secured (e.g., adhesively affixed) within a longitudinal bore 334 of the ferrule 422. The expanded beam fiber segment 424 is configured for expanding light beams traveling in a direction from the cable optical fiber 356 toward the expanded beam fiber segment 424 and for focusing light beams traveling in a direction from the expanded beam fiber segment 424 toward the cable optical fiber 356. The expanded beam fiber segment 424 can include a construction for expanding a mode field diameter along a length of the expanded beam fiber segment 424.

The expanded beam fiber segment 424 can be referred to as a "GRIN lens." The typical length of GRIN lens is about 300 micrometers depending on the requirements. This length typically corresponds to one quarter pitch. GRIN lens typically has a length tolerance of about ±10 micrometers. An example expanded beam fiber is disclosed at U.S. Pat. No. 7,031,567, which is hereby incorporated by reference in its entirety. Maximum expansion achieved at the multiple of quarter pitch of GRIN lens.

Referring again to FIG. 11, the ferrule 422 can include a front end 426 positioned opposite from a rear end 428. The front end 426 preferably includes an end face 430 at which an interface end 432 of the beam expanded fiber segment 424 is located. The expanded beam fiber segment 424 includes a first portion 438 that can be positioned within the ferrule and extend therethrough from the front end 426 to the rear end 428 of the ferrule 422. The expanded beam fiber segment 424 can further include a second portion 440 that resides outside the ferrule 422. The first portion 438 can be secured within the ferrule 422 and the second portion 440 can extend rearwardly from the ferrule 422. The first portion 438 of the expanded beam fiber segment 424 can be secured by an adhesive (e.g., epoxy) within the ferrule bore 334 of the ferrule 422. The interface end 432 preferably includes a polished end face 430 accessible at the interface end 432 of the ferrule 422. The expanded beam fiber segment 424 can extend all the way through the ferrule 422 without any splices within the ferrule 422.

Referring again to FIG. 9, the concepts and features of the connector body 304 and hub 464 are similar to the connector body 26 and hub 36 described above in FIG. 1. As such, the description for the connector body 26 and hub 36 are hereby incorporated by reference in their entirety for the connector body 304 and hub 464. In certain embodiments, the hub 464 provides structure against which the bias of the spring 318 can be applied to bias the hub 464 and the ferrule 422 forwardly relative to the connector body 304. The boot 310, the rear piece 314 and the spring 318 all can have internal dimensions (e.g., inner diameters) larger than an outer dimension (e.g., an outer diameter) of the cable 354 such that during assembly/manufacturing the boot 310, the rear piece 314 and the spring 318 can be slid back over the jacket 358 to provide space/clearance for splicing and application of the hub 464.

Figure 13:
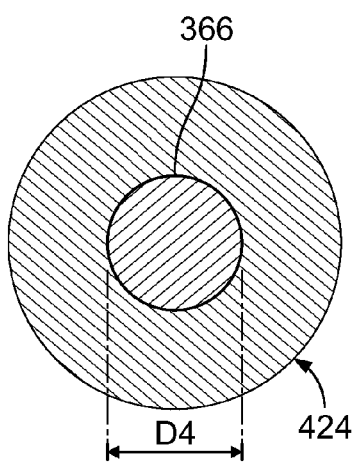
FIG. 13 cross-sectional view of an expanding beam fiber segment shown in the ferrule assembly of FIG. 12.
Figure 14:
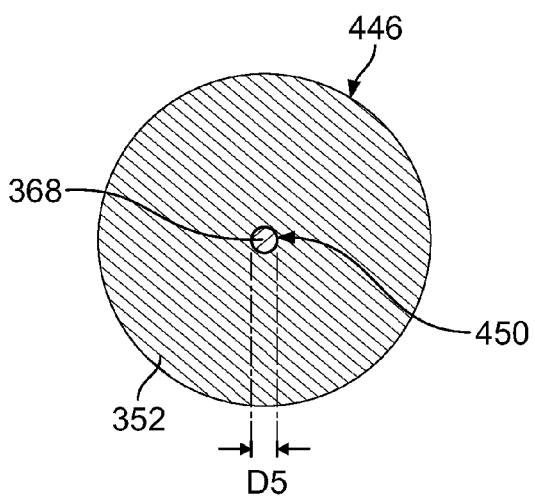
FIG. 14 a cross-sectional view of a single mode optical fiber shown in the ferrule assembly of FIG. 12.

Referring to FIGS. 13-14, the expanded beam fiber segment 424 has a first mode field diameter D4 and the expanded beam fiber segment 424 has a second mode field diameter D5. The expanded beam fiber segment 424 provides an expansion of the mode field diameter from the smaller mode field diameter D4 of the optical fiber 446 to the larger mode field diameter D5 of the expanded beam fiber segment 424. FIG. 13 shows a mode field area 366 of the expanded beam fiber segment 424 with the first mode field diameter D4. FIG. 14 shows a smaller mode field area 368 of the optical fiber 446 with the second mode field diameter D5. In this example, the first mode field diameter D4 can be at least two times as large as the second mode field diameter D5. In other examples, the first mode field diameter D4 can have a diameter expansion from about 20 micrometers up to about 125 micrometers. The expanded beam fiber segment 424 can convert the mode field of an optical signal of the optical fiber 446 to be significantly greater by expanding the second mode field diameter D5 up to a desired expansion.

As shown in FIGS. 12 and 14, the optical fiber 446 can have a core region 450 surrounded by a cladding region 352. In some examples, the core region 450 of the optical fiber 446 can have a diameter in the range of about 8 micrometers to about 12 micrometers. In other examples, the cladding region 352 of the optical fiber 446 can have an outer diameter of about 125 micrometers. The optical fiber 446 can be optically coupled to the fiber optic cable 354.

It will be appreciated that the beam expanding fiber segment 354 functions to provide an expansion in mode field diameter between the optical fiber 446 and the expansion beam fiber segment 424 (see FIG. 12 where the mode fields are the darkened portions of the fiber segments).

Figure 15:
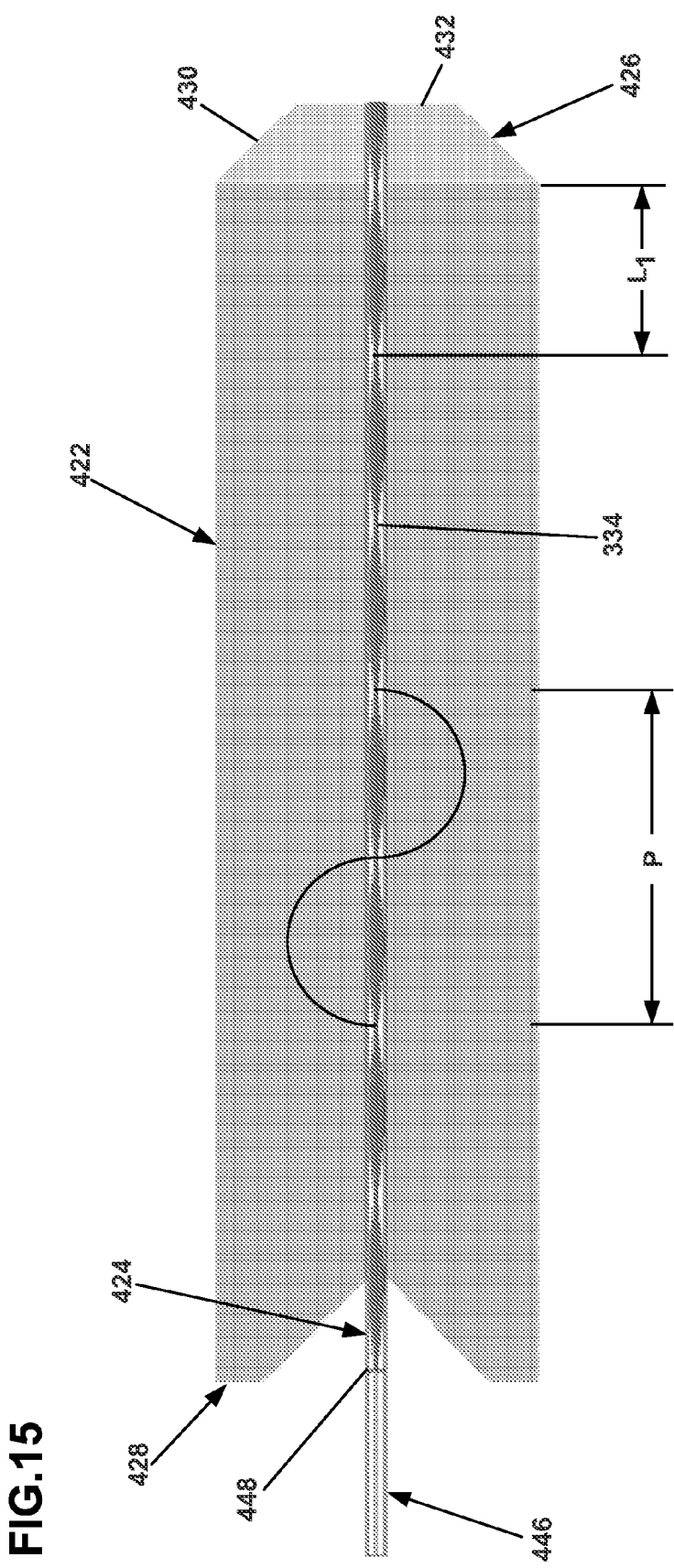
FIG. 15 is a perspective view of a ferrule assembly with an odd integer ¼-pitch GRIN lens in accordance with the principles of the present disclosure.

Referring to FIG. 15, the expanded beam fiber segment 424 is depicted within a ferrule 422. Due to the parabolic shape of the expanded beam fiber segment 424, the modal fields that can travel in the expanded beam fiber segment have different propagation coefficients, but are evenly distributed with respect to each other. As such, the constructive and destructive interference of the near-field is of periodic nature. In this example, the expanded beam fiber segment 424 has an odd integer ¼ pitch length $L_1$. A ¼ pitch length is about 3 micrometers. The "pitch" P of the lens is the fraction of a full sinusoidal period that the ray traverses in the lens (i.e., a lens with a pitch of 0.25 has a length equal to ¼ of a sine wave, which would collimate a point source at the surface of the lens). The expanded beam fiber segment 424 is nicely collimated at the interface end 432 of the ferrule 422 by exploiting the periodicity of the interfering modal fields in the expanded beam fiber segment 424. This provides for the desired selection of an integer multiple of the original expanded beam fiber segment 424 length. The expanded beam fiber segment 424 is a ¼ pitch, so that the optical field is expanded. A ½ pitch (2 quarter pitches) gives an intermediate focus F (see FIG. 16). Therefore, the odd integer multiple shown in FIG. 15 provides for the maximum expanded beam.

Figure 16:
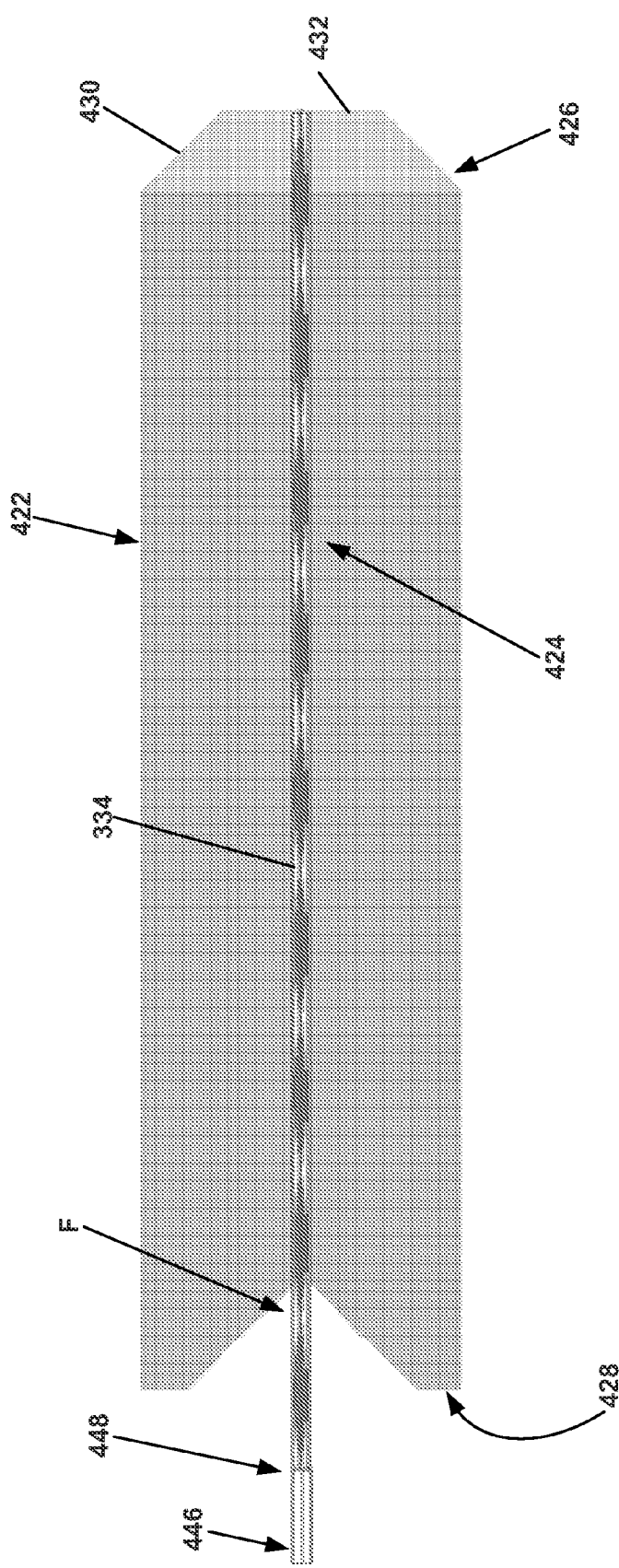
FIG. 16 is a perspective view of a ferrule assembly with an even integer ¼-pitch GRIN lens in accordance with the principles of the present disclosure.

Referring to FIG. 16 the expanded beam fiber segment 424 is depicted within the ferrule 422. In this example, the expanded beam fiber segment 424 has an even integer ¼ pitch length $L_1$. The even integer multiple provides for an imaging lens or (focused) field. The even-integer multiple of the pitch GRIN lens can be constructed to maintain polarization focus or expand. In some examples, the expanded beam fiber segment 424 can be larger than the ferrule 422 if the integer multiple is large enough. The expanded beam fiber segment 424 expand light beams traveling from optical fiber 446 to the expanded beam fiber segment 424 and to focus light beams traveling from the expanded beam fiber segment 424 to the optical fiber 446.

In some examples, the expanded beam fiber segment 424 can have at least two pitch lengths. In other examples, the expanded beam fiber segment 424 can have at least 3 pitch lengths. In another example, the expanded beam fiber segment 424 can have at least one pitch length and an even integer of quarter pitches. In another example, the expanded beam fiber segment 424 can have at least one pitch length and an odd integer of quarter pitches. Still in other examples, the expanded beam fiber segment 424 can have a pitch length that is longer or shorter than a quarter pitch such that expansion can be tuned to achieve a desired mode field diameter. Therefore, the mode conversion can be done by giving more area around even number of pitches such that the pitch length can be shorter or longer. This can help to tune the expanded beam fiber segment 424 to a mating fiber or tune it in light of an air gap. This arrangement eliminates the need to have an exact ¼ pitch. It is to be understood that the pitch length may vary with other examples.

Turning again to FIG. 11 the loose buffer tube 360 (i.e. furcation tube) can surround and protect at least a portion of the optical fiber 356. The buffer layer 362 can be affixed or otherwise bonded to the exterior surface of the buffer tube 360 and also can fill a portion of the buffer tube 360 so as to bond with an interior surface of the buffer tube 360. The buffer layer 362 projects rearwardly beyond a rearward end of a hub 464. In this way, the rearward end of the hub 464 can circumferentially surround and contact the buffer layer 362 but does not contact the buffer tube 360. Thus, a mold for forming the hub 464 can be configured to shut-off around the buffer layer 362 rather than the buffer tube 360. In some examples, the buffer layer 362 has an outer diameter larger than an outer diameter of the buffer tube 360.

In the depicted example, the fiber optic connector 302 is shown as a standard SC-type connector. The concepts and features of the fiber optic connector 302 are similar to the fiber optic connector 22 described above. As such, the description for the fiber optic connector 22 is hereby incorporated by reference in its entirety for the fiber optic connector 302.

After the fusion splice has been completed, a protective layer 330 can be placed, applied or otherwise provided over the optical fibers 446, 356 in the region between the rear end 428 of the ferrule 422 and a buffered/coated portion of the optical fiber 356. The fiber optic connector 302 fully complies with Telcordia GR-326 or similar stringent industry or customer specifications.

The ferrule 422 can be constructed of a relatively hard material capable of protecting and supporting the first portion 438 of the expanded beam fiber segment 424. The concepts and features of the ferrule 422 are similar to the ferrule 34 described above. As such, the description for the ferrule 34 is hereby incorporated by reference in its entirety for the ferrule 422.

Figure 17:
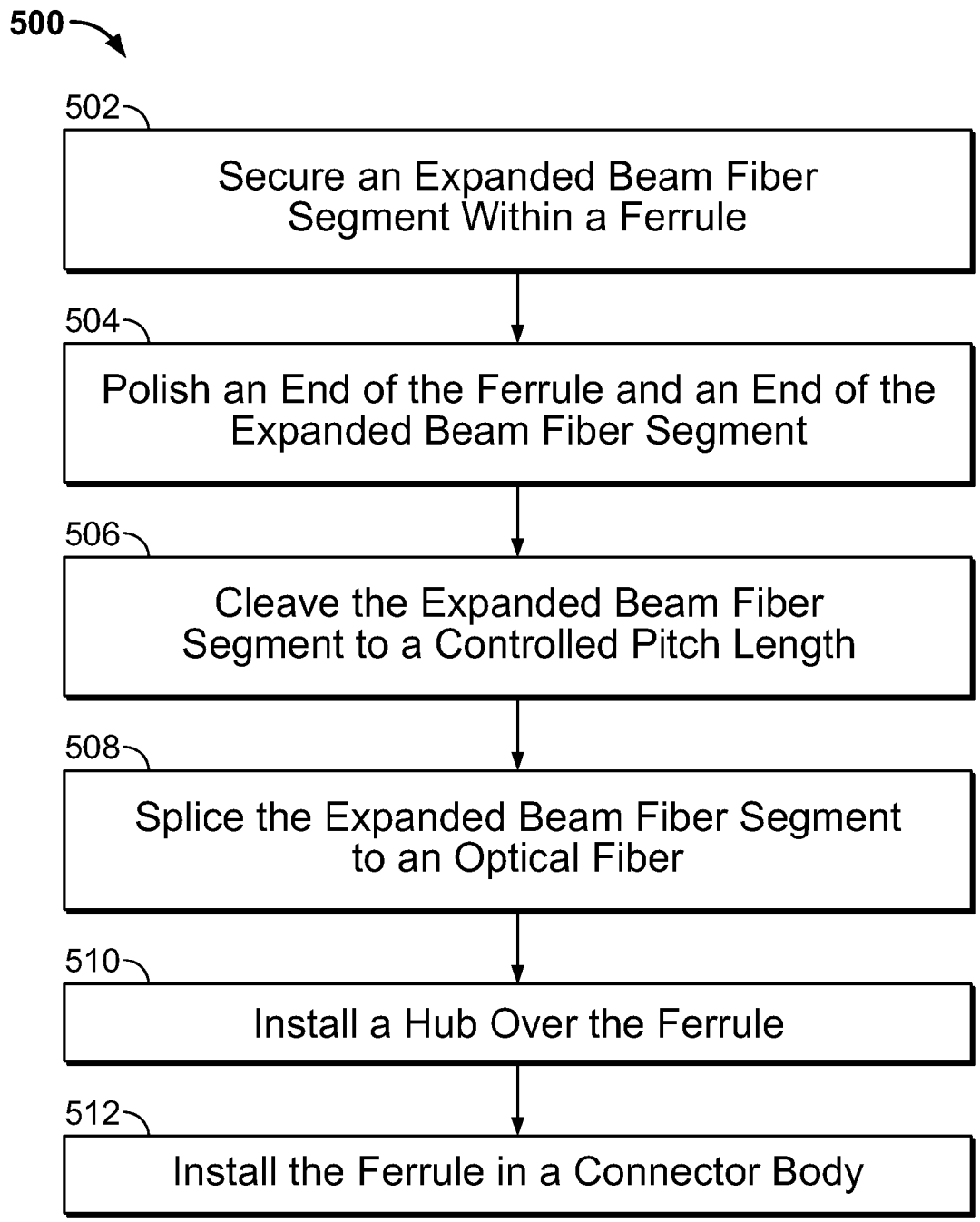
FIG. 17 is a flow chart illustrating a method for assembling a ferrule assembly in accordance with the principles of the present disclosure.

FIG. 17 is a flow chart illustrating an example method 500 for manufacturing a ferrule assembly including the ferrule 422 and the expanded beam fiber segment 424 (i.e. GRIN lens). In this example, the method 500 includes operations 502, 504, 506, 508, 510, and 512.

The operation 502 is performed to secure the expanded beam fiber segment 424 (i.e. GRIN lens) in the ferrule 422. An arbitrary length can be used to glue the expanded beam fiber segment 424 in the ferrule 422. An example of the expanded beam fiber segment 424 (i.e. GRIN lens) is shown and described with reference to FIGS. 9-11.

The operation 504 is performed to polish an end of the ferrule 422 and an end of the expanded beam fiber segment 424. The Examples of the ferrule 422 and the expanded beam fiber segment 424 (i.e. GRIN lens) are shown and described in FIG. 9.

The operation 506 is performed to cleave the expanded beam fiber segment 424 (i.e. GRIN lens) to a controlled pitch length. The selection can be made to achieve a specific amount of expansion.

The operation 508 is performed to splice the expanded beam fiber segment 424 (i.e. GRIN lens) to a single mode optical fiber 446. An example of the single mode optical fiber 446 is illustrated and described in more detail in FIGS. 9-10.

The operation 510 is performed to install the hub 464 over the ferrule 422. An example of the hub 464 is illustrated and described in more detail in FIG. 9.

The operation 512 is performed to install the ferrule 422 in the connector body 304. An example of the connector body 304 is illustrated and described in more detail in FIGS. 15-16.

Another aspect of the present disclosure relates to a method for mass producing and distributing fiber optic connector assemblies. For example, ferrule assemblies can be manufactured in a first factory location using the highly precise polishing technology and equipment. The first factory location can be used to manufacture the ferrule assembly according to method operations 502-506. By manufacturing such large volumes of ferrule assemblies at one centralized location, the ferrule assemblies can be made efficiently and considerable capital investment can be made in premium quality manufacturing equipment and processes.

The method also relates to distributing ferrule assemblies manufactured at a second location to regional factories/mass production locations closer to the intended point of sales. The relative small size of ferrule assemblies allows large volumes of such ferrule assemblies to be effectively shipped at relatively low costs. High costs associated with extensive shipment of cable can be significantly reduced. The method operations 508-512 can be performed at regional factories/mass productions closer to the intended point of sales. A significant aspect of the method relates to a GRIN lens that can be fusion spliced to a single mode optical fiber at a location behind the rear end of the ferrule.

Aspects of the present disclosure allow ferrule assemblies to be manufactured in large volumes at manufacturing locations where the process is most class effective. The ferrule assemblies, which are small in size, can be effectively stripped in bulk to factory/assembly locations closer to customer locations where the ferrule assemblies can be spliced to fiber optic cables and a final connector assembly can take place. In this way, shipping of the cable itself (which tends to be larger in size and weight) can be minimized. Also, final assembly can be made closer to customer locations thereby increasing lead times. Global supply chains can also be enhanced. From the foregoing detailed description, it will be evident that modifications and variations can be made without departing from the spirit and scope of the disclosure.

In other embodiments, aspects of the present disclosure can be used with ferrule-less connectors where the optical fiber stub is not supported within a ferrule.

What is claimed is:

1. A fiber optic cable and connector assembly comprising:
   a ferrule having a front end and a rear end;
   a cable optical fiber;
   an optical fiber stub having a first portion and a second portion, the second portion projects rearwardly from the rear end of the ferrule, the optical fiber stub having a constant mode field diameter along its length, the optical fiber stub having a larger mode field diameter than the cable optical fiber; and
   a beam expanding fiber segment optically coupled between the cable optical fiber and the optical fiber stub;
   wherein the first portion of the optical fiber stub is secured within a bore of the ferrule and the second portion of the optical fiber stub is spliced to the beam expanding fiber segment at a first splice; and
   wherein the beam expanding fiber segment is spliced to the cable optical fiber at a second splice.

2. The fiber optic cable and connector assembly of claim 1, wherein a ferrule hub is positioned over the rear end of the ferrule, over the beam expanding fiber segment and over the first splice.

3. The fiber optic cable and connector assembly of claim 2, wherein the first splice is within 5 millimeters of the rear end of the ferrule.

4. The fiber optic cable and connector assembly of claim 2, wherein the hub is over molded over the rear end of the ferrule, over the beam expanding fiber segment and over the first splice.

5. The fiber optic cable and connector assembly of claim 1, wherein the first splice is within 20 millimeters of the rear end of the ferrule.

6. The fiber optic cable and connector assembly of claim 1, further comprising a connector body at least partially containing the optical fiber stub and the beam expanding fiber segment.

7. The fiber optic cable and connector assembly of claim 6, wherein the cable optical fiber is part of a cable having a jacket and strength members, and wherein the strength members are anchored to the connector body.

8. The fiber optic cable and connector assembly of claim 1, wherein the beam expanding fiber segment is a graduated index fiber.

9. The fiber optic cable and connector assembly of claim 1, wherein the beam expanding fiber segment is a quarter pitch GRIN lens.

10. The fiber optic cable and connector assembly of claim 1, wherein the beam expanding fiber includes a pre-expansion fiber spliced to a primary expansion fiber.

11. The fiber optic cable and connector assembly of claim 1, wherein the optic fiber stub is a step index fiber.

12. The fiber optic cable and connector assembly of claim 1, wherein the mode field diameter of the optical fiber stub is at least 50% larger than the mode field diameter of the cable optical fiber.

13. The fiber optic cable and connector assembly of claim 1, wherein the optical fiber stub has a core diameter of at least 12 microns.

14. The fiber optic cable and connector assembly of claim 1, wherein the mode field diameter of the optical fiber stub is at least three times as large as the mode field diameter of the cable optical fiber.

15. The fiber optic cable and connector assembly of claim 1, wherein the mode field diameter of the optical fiber stub is at least four times as large as the mode field diameter of the cable optical fiber.

16. The fiber optic cable and connector assembly of claim 1, wherein a core diameter of the optical fiber stub is at least 50% larger than a core diameter of the cable optical fiber.

17. A method for mass producing fiber optic connector assemblies including fiber optic connectors connected to fiber optic cables, the fiber optic connectors including ferrule assemblies having optical fiber stubs supported in ferrules, the method comprising:
   manufacturing the ferrule assemblies at a first central location in volumes exceeding 1,000,000 of the ferrule assemblies per year; and
   distributing the ferrule assemblies from the first central location to a second regional location where the fiber optic connector assemblies are mass produced by fusion splicing the optical fiber stubs to beam expanding fiber segments, wherein the beam expanding fiber segments are then fusion spliced to cable optical fibers having mode field diameters that are smaller than mode field diameters of the optical fiber stubs.

18. A method for mass producing fiber optic connector assemblies including fiber optic connectors connected to fiber optic cables, the fiber optic connectors including ferrule assemblies having optical fiber stubs supported in ferrules, the ferrule assemblies also including beam expanding fiber segments spliced to rear ends of the optical fiber stubs at locations rearwardly offset from rear ends of the ferrules, the method comprising:
   manufacturing the ferrule assemblies at a first central location in volumes exceeding 1,000,000 of the ferrule assemblies per year; and
   distributing the ferrule assemblies from the first central location to a second regional location where the fiber optic connector assemblies are mass produced by fusion splicing the beam expanding fiber segments to cable optical fibers having mode field diameters that are smaller than mode field diameters of the optical fiber stubs.

19. A fiber optic cable and fiber assembly comprising:
   a ferrule having a front end and a rear end;
   an expanded beam fiber segment having a front portion secured within the ferrule and a rear portion that projects rearwardly from the rear end of the ferrule; and
   a fiber optic cable having a single mode optical fiber optically coupled to the expanded beam fiber segment at a splice location behind the rear end of the ferrule.

* * * * *